(12) United States Patent
Cao et al.

(10) Patent No.: US 10,990,864 B2
(45) Date of Patent: Apr. 27, 2021

(54) LIQUID METAL-BASED INFORMATION IDENTIFICATION SYSTEM

(71) Applicant: BEIJING DREAM INK TECHNOLOGIES CO., LTD., Beijing (CN)

(72) Inventors: Zhiqiang Cao, Beijing (CN); Yang Yu, Beijing (CN); Shijin Dong, Beijing (CN); Jing Liu, Beijing (CN)

(73) Assignee: BEIJING DREAM INK TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/628,794

(22) PCT Filed: Jul. 6, 2018

(86) PCT No.: PCT/CN2018/094825
§ 371 (c)(1),
(2) Date: Jan. 6, 2020

(87) PCT Pub. No.: WO2019/007419
PCT Pub. Date: Jan. 10, 2019

(65) Prior Publication Data
US 2020/0202188 A1 Jun. 25, 2020

(30) Foreign Application Priority Data
Jul. 7, 2017 (CN) .......................... 201710549834.1

(51) Int. Cl.
*G06K 19/02* (2006.01)
*G06K 7/14* (2006.01)
*G06K 19/06* (2006.01)

(52) U.S. Cl.
CPC .......... *G06K 19/025* (2013.01); *G06K 7/1408* (2013.01); *G06K 19/06046* (2013.01)

(58) Field of Classification Search
CPC .......... B22F 3/115; B43K 5/00; G01D 21/02; G01K 1/024; G06K 7/10366;
(Continued)

(56) References Cited

U.S. PATENT DOCUMENTS

| 4,198,617 A * | 4/1980 | Hara | H01H 37/761 337/403 |
| 6,320,169 B1 * | 11/2001 | Clothier | G06K 19/0723 219/626 |

(Continued)

FOREIGN PATENT DOCUMENTS

| CN | 1757270 A | 4/2006 |
| CN | 103153640 A | 6/2013 |

(Continued)

OTHER PUBLICATIONS

Khan et al.: "A Frequency Shifting Liquid Metal Antenna with Pressure Responsiveness", Mohammad Rashed Khan, Gerald J. Hayes, Ju-Hee So, Gianluca Lazzi and Michael D. Dickey; Appl. Phys. Lett. 99, 013501 (2011); https://doi.org/10.1063/1.3603961; Published Online: Jul. 5, 2011. (Year: 2011).*

(Continued)

*Primary Examiner* — Stephen R Burgdorf
(74) *Attorney, Agent, or Firm* — Carlson, Gaskey & Olds (57) ABSTRACT

A liquid metal-based information identification system includes a recognizer and a smart tag. The smart tag is configured to record environment information of an environment where an article is located through a sensor, and to send the environment information to the recognizer via a flexible circuit. The flexible circuit is internally used by the smart tag and comprises a circuit made of a liquid metal provided with a microfluidic channel including a vacuum chamber. When the liquid metal is in a phase transition, the liquid metal enters the microfluidic channel in such a manner that the circuit made of the liquid metal is short- (Continued)

circuited or disconnected. The recognizer is configured to receive and analyze the environment information, and to download first information of an article production link to the smart tag.

7 Claims, 4 Drawing Sheets (58) Field of Classification Search
CPC .... G06K 7/1408; G06K 19/02; G06K 19/025; G06K 19/06046; G06K 19/0707; G06K 19/0717; G06K 19/077; G06K 19/0723; G06Q 10/0833; H04Q 9/00; H05K 7/20281
USPC ........................................................ 340/572.1
See application file for complete search history.

(56) References Cited

U.S. PATENT DOCUMENTS

| | | | | |
|---|---|---|---|---|
| 9,093,749 | B2* | 7/2015 | Tsai | H01Q 9/28 |
| 9,116,145 | B2* | 8/2015 | Li | B01L 3/502707 |
| 9,716,313 | B1* | 7/2017 | Mumcu | H01Q 3/02 |
| 10,104,805 | B2* | 10/2018 | Lazarus | H05K 1/0283 |
| 10,547,123 | B2* | 1/2020 | Lazzi | H01R 3/08 |
| 2007/0017983 | A1* | 1/2007 | Frank | G06Q 10/087 |
| | | | | 235/385 |
| 2007/0152829 | A1* | 7/2007 | Lindsay | G06K 19/0717 |
| | | | | 340/572.3 |
| 2009/0303003 | A1* | 12/2009 | Pritchard | G06Q 10/0833 |
| | | | | 340/10.1 |
| 2011/0045577 | A1* | 2/2011 | Bruzewicz | B01L 3/502707 |
| | | | | 435/287.1 |
| 2012/0075069 | A1* | 3/2012 | Dickey | G01L 1/205 |
| | | | | 340/10.1 |
| 2013/0168454 | A1* | 7/2013 | Oh | B42D 15/022 |
| | | | | 235/492 |
| 2014/0015642 | A1* | 1/2014 | White | G06K 7/10188 |
| | | | | 340/10.1 |
| 2017/0229000 | A1* | 8/2017 | Law | G01K 3/04 |

FOREIGN PATENT DOCUMENTS

| | | |
|---|---|---|
| CN | 106574873 A | 4/2017 |
| CN | 107563473 A | 1/2018 |
| JP | 2001319199 A | 11/2001 |

OTHER PUBLICATIONS

Jonietz: This Antenna Bends but Won't Break, Erika Jonietz; Intelligent Machines; Dec. 7, 2009. (Year: 2009).*

Traille et al.: "A Wireless Passive RCS-based Temperature Sensor using Liquid Metal and Microfluidics Technologies"; A.Traille, S. Bouaziz, S.Pinon, P. Pons, H. Aubert, A. Boukabache, M. Tentzeris; Proceedings of the 41st European Microwave Conference; p. 45-48; 978-2-87487-022-4 © 2011 EuMA (Year: 2011).*

International Search Report for International application No. PCT/CN2018/094825 dated Oct. 10, 2018.

* cited by examiner

LIQUID METAL-BASED INFORMATION IDENTIFICATION SYSTEM

CROSS-REFERENCE TO RELATED APPLICATIONS

This national stage application of International Application No. PCT/CN2018/094825, filed on Jul. 6, 2018, claims priority and benefits to Chinese Patent Application No. 201710549834.1, filed on Jul. 7, 2017. The disclosures of the aforementioned applications are incorporated by reference in their entireties.

TECHNICAL FIELD

The present disclosure relates to the field of Internet of Things and information security, and specifically, to a liquid metal-based information identification system.

BACKGROUND

The Radio Frequency Identification (RFID) is a communication technology, which can identify a specific target through radio signals, read and write relevant data without building mechanical or optical contact between an identification system and the specific target.

At present, development of the Radio Frequency Identification is becoming mature gradually. However, a traditional RFID system typically has a large size, and installation and use processes thereof are relatively complicated. This is because it is difficult to process a traditional circuit board used in a manufacturing process to have a delicate volume, and plastic or metal casing encapsulation is also required, which makes an overall volume relatively large and makes it difficult to be flexible, thereby limiting its wider application in the Internet of Things. Moreover, the information security of the traditional RFID system obtains a higher level of security usually by continuously improving an encryption algorithm under a communication protocol, but algorithm-based encryption methods are all software-level solutions and all encryption programs have a certain logical form, which can be cracked through a series of reverse methods.

SUMMARY

In view of the shortcomings and defects in the prior art, the present disclosure provides a liquid metal-based information identification system.

An embodiment of the present disclosure provides a liquid metal-based information identification system, including a recognizer and a smart tag. The smart tag is configured to record, through at least one sensor, environment information of an environment in which an article is located, and to transmit the environment information to the recognizer through a flexible circuit. The smart tag internally uses the flexible circuit, and the flexible circuit comprises a circuit made of a liquid metal. A microfluidic channel having a vacuum chamber is provided in the circuit made of the liquid metal. When the liquid metal is in a phase transition, the liquid metal enters the microfluidic channel in such a manner that the circuit made of the liquid metal is short-circuited or disconnected. The recognizer is configured to receive and analyze the environment information and to download first information of a production link of the article to the smart tag.

Preferably, the flexible circuit comprises a flexible substrate and a liquid metal circuit, and the liquid metal circuit is attached to the flexible substrate and comprises the circuit made of the liquid metal and an antenna made of the liquid metal; the at least one sensor comprises one or more of a temperature sensor, a humidity sensor, an air pressure sensor, a vibration sensor, a pressure sensor, a speed sensor, an acceleration sensor, a gravity sensor, a light sensor, an electromagnetic radiation sensor, an ionizing radiation sensor, a noise sensor, a gas sensor, a dust particle sensor and a micro-organism detection sensor; and the smart tag further comprises a chip and a warning unit, wherein the chip is configured to control the at least one sensor to work, and to transmit the environment information collected by the at least one sensor to the recognizer through the flexible circuit, and to store the first information, and the warning unit is configured to warn when at least one datum collected by at least one of the at least one sensor exceeds a corresponding threshold.

Preferably, the recognizer specifically includes a data transmission module, a first energy supply module, an analysis module and an information storage module, wherein the data transmission module is configured to establish connection with the smart tag to perform bidirectional transmissions of data; the first energy supply module is configured to supply energy to the smart tag to enable the smart tag to upload and download data; the analysis module is configured to analyze the environment information sent by the smart tag, and a graphic change, a change in a magnetic property of the liquid metal and a change in composition of the liquid metal that are caused by the phase transition of the liquid metal in an information identification region of the smart tag, and to store an analysis result in the information storage module, wherein the smart tag has the information identification region, in which a graphic drawn by the liquid metal is arranged, and the graphic is a pattern that is obtained by sequentially coding and symbolizing second information in an article circulation link, or an identifiable pattern that is randomly generated; and the information storage module is further configured to store the first information.

Preferably, the chip includes a control chip and a memory chip, the circuit made of the liquid metal comprises a fuse circuit, the memory chip stores the first information, and when the at least one datum collected by at least one of the at least one sensor exceeds the corresponding threshold, the control chip starts the fuse circuit to operate to fuse the circuit made of the liquid metal or to burn the memory chip.

Preferably, the system further includes a mobile energy supply module configured to supply energy to the smart tag.

Preferably, the mobile energy supply module includes a power source module configured to provide an energy supply source, a second energy supply module configured to supply energy to the smart tag by using the energy supply source, and a control module configured to control an energy supply to the second energy supply module.

Preferably, the control module is specifically configured to control a manner in which the second energy supply module supplies energy to the smart tag, and the manner comprises continuous energy supply, intermittent energy supply, energy supply in a preset time period, or condition-triggered energy supply.

Preferably, the mobile energy supply module has a structural form of a patch type, an adhesive type, a magnetic adsorption type, a fixed installation type, or a suspension type.

As for the liquid metal-based information identification system provided by embodiments of the present disclosure, in one aspect, the system incorporates phase transition characteristics of the liquid metal to enable the flexible circuit to be printed directly, and the flexible circuit can be used to manufacture a completely flexible smart tag, making its volume further slimmer, which greatly widen its application scope in the Internet of Things; in another aspect, the system proposes a physical-level encryption method, the circuit made of the liquid metal provided with the microfluidic channel having the vacuum chamber therein can utilize the phase transition characteristics of the liquid metal to generate a circuit structure that is mechanical, irreversible, random, and changes the smart tag, so as to protect data in the smart tag. Such illogical encryption method appears to be more reliable compared with a software-level encryption method, making the phase transition characteristics of the liquid metal more advantageous when it is used in cold chain logistics.

DESCRIPTION OF EMBODIMENTS

In order to make objectives, technical solutions, and advantages of the embodiments of the present disclosure clearer, technical solutions in embodiments of the present disclosure will be clearly described below with reference to the accompanying drawings in the embodiments of the present disclosure. Obviously, the described embodiments are part but not all of the embodiments of the present disclosure. Based on the embodiments of the present disclosure, all other embodiments obtained by those skilled in the art without creative efforts shall fall within the protection scope of the present disclosure.

Figure 1:
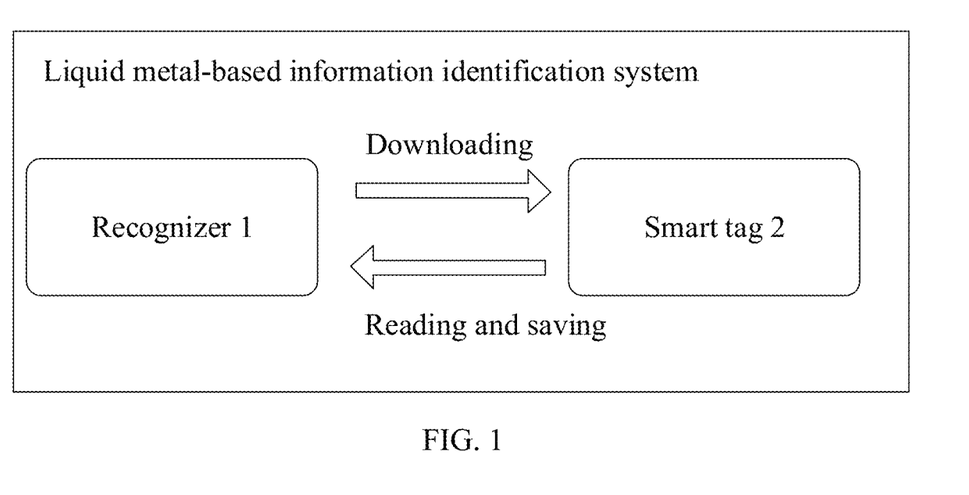
FIG. 1 is a schematic diagram of a liquid metal-based information identification system according to an embodiment of the present disclosure.

Referring to FIG. 1, the present embodiment discloses a liquid metal-based information identification system.

The liquid metal-based information identification system includes a recognizer 1 and a smart tag 2.

The smart tag 2 is configured to record, through a sensor, environment information of an environment in which an article is located and to transmit the environment information to the recognizer 1 through a flexible circuit. The smart tag 2 internally uses the flexible circuit including a circuit made of a liquid metal, and a microfluidic channel having a vacuum chamber is provided in the circuit made of the liquid metal. When the liquid metal is in a phase transition, the liquid metal enters the microfluidic channel in such a manner that the circuit made of the liquid metal is short-circuited or disconnected.

In this embodiment, when the article enters an environment of a relatively high temperature from an environment with a relatively low cold chain temperature, the liquid metal will be in a phase transition, so as to trigger the liquid metal to enter the circuit made of the liquid metal to short-circuit or disconnect the circuit made of the liquid metal, such that the smart tag can no longer transmit data to outside, thereby protecting data of the smart tag from being leaked. A melting point of the liquid metal is below 300° C., and its metal composition is selected from one or more of gallium, indium, tin, zinc, bismuth, lead, cadmium, copper, silver, gold, mercury, sodium, potassium, magnesium, aluminum, iron, cobalt, nickel, manganese, titanium, vanadium or the like, and its form can be a metal elementary substance, an alloy, or an electrical conductive fluid formed by mixing with a fluid dispersant, nanomaterial, magnetic material, and the like.

The recognizer 1 is configured to receive and analyze the environment information and to download first information (such as process parameters of a production link) of the production link of the article to the smart tag 2.

As for the liquid metal-based information identification system provided by embodiments of the present disclosure, in one aspect, the system incorporates phase transition characteristics of the liquid metal to enable the flexible circuit to be printed directly, and the flexible circuit can be used to manufacture a completely flexible smart tag, making its volume further thinner, which greatly widen its application scope in the Internet of Things; in another aspect, the system proposes a physical-level encryption method, the circuit made of the liquid metal provided with the microfluidic channel having the vacuum chamber therein, can utilize the phase transition characteristics of the liquid metal to generate a circuit structure that is mechanical, irreversible, random, and changes the smart tag, so as to protect data in the smart tag. Such illogical encryption method appears to be more reliable compared with a software-level encryption method, making the phase transition characteristics of the liquid metal more advantageous when it is used in cold chain logistics.

On the basis of the foregoing embodiment, the flexible circuit can include a flexible substrate and a liquid metal circuit. The liquid metal circuit is attached to the flexible substrate (which can be a flexible material such as organic polymer, silicone, braid, paper, biological tissue, etc.), and the liquid metal circuit includes the circuit made of the liquid metal and an antenna made of the liquid metal.

The sensors include one or more of a temperature sensor, a humidity sensor, an air pressure sensor, a vibration sensor, a pressure sensor, a speed sensor, an acceleration sensor, a gravity sensor, a light sensor, an electromagnetic radiation sensor, an ionizing radiation sensor, a noise sensor, a gas sensor, a dust particle sensor, or a micro-organism detection sensor.

The smart tag further includes a chip and a warning unit.

The chip is configured to control the sensor to operate, and to transmit the environment information collected by the sensor to the recognizer through the flexible circuit, and to store the first information.

The warning unit is configured to warn when a datum collected by at least one of the sensors exceeds a corresponding threshold.

In this embodiment, corresponding to specific arrangement of the sensor, the environment information received by the recognizer includes at least one of temperature, humidity, air pressure, pressure, vibration, speed, acceleration, gravity, light, noise, electromagnetic radiation, ionizing radiation, gas composition and dust particle information, and at least one of micro-organisms in the environment in which the article is in. When the liquid metal is in the phase transition, the circuit made of the liquid metal will be short-circuited or disconnected (for example, it is possible to randomly change a pin of the chip that is connected to the circuit, to bring the chip into a sleep state so that it cannot transmit data to the outside). The warning unit can be a miniature light emitting and buzzer circuit, and when the datum collected by at least one of the sensors exceeds the corresponding threshold (this threshold can be set as required, and it is not limited here in detail), the warning unit raises an alarm.

Based on the foregoing embodiment, the recognizer can specifically include a data transmission module, a first energy supply module, an analysis module and an information storage module.

The data transmission module is configured to establish connection with the smart tag, to perform bidirectional transmissions of data.

The first energy supply module is configured to supply energy to the smart tag to enable the smart tag to upload and download data.

The analysis module is configured to analyze the environment information sent by the smart tag, and a graphic change, a change in a magnetic property of the liquid metal and a change in composition of the liquid metal that are caused by the phase transition of the liquid metal in an information identification region of the smart tag, and to store an analysis result in the information storage module. The smart tag has the information identification region in which a graphic drawn by the liquid metal is arranged, and the graphic is a pattern that is obtained by sequentially coding and symbolizing second information (such as a product number) in an article circulation link, or an identifiable pattern that is randomly generated.

The information storage module is further configured to store the first information.

In this embodiment, it should be noted that the graphic can be a pattern that is obtained by sequentially encoding and symbolizing the second information in the article circulation link, or it can be the identifiable pattern that is randomly generated.

On the basis of the foregoing embodiment, the chip can include a control chip and a memory chip, and the circuit made of the liquid metal includes a fuse circuit. The memory chip stores the first information, and when the datum collected by at least one of the sensors exceeds the corresponding threshold, the control chip starts the fuse circuit to operate in such a manner that the circuit made of the liquid metal is fused or the memory chip is burned.

In this embodiment, it should be noted that after the control chip starts the fuse circuit to work, the fuse circuit can be fused when its temperature reaches a certain value in such a manner that the circuit made of the liquid metal is fused or the memory chip is burned; or after the control chip starts the fuse circuit to work, the circuit made of the liquid metal that is connected to the fuse circuit is in the phase transition as the temperature of the fuse circuit increases, thereby short-circuiting or disconnecting the circuit made of the liquid metal to finally achieve a purpose of protecting the data recorded in the smart tag.

On the basis of the foregoing embodiments, the system can further include a mobile energy supply module configured to supply energy to the smart tag.

On the basis of the foregoing embodiments, the mobile energy supply module can include a power source module, a second energy supply module and a control module.

The power source module is configured to provide an energy supply source (which can include a commercial power source, a battery, and the battery thereof can be a solar cell, a nickel-hydride battery, a lithium battery, a fuel cell, a thin film battery, etc.).

The second energy supply module is configured to supply energy to the smart tag by using the energy supply source.

The control module is configured to control an energy supply of the second energy supply module.

The second energy supply module provides energy to one or more smart tags in a certain area mainly in a manner of induction. While being responsible for an overall control to the mobile energy supply module, the control module also determines a manner to supply energy to the smart tag, including continuous energy supply, intermittent energy supply, energy supply in a preset time period, condition-triggered energy supply, or the like.

On the basis of the foregoing embodiments, the mobile energy supply module has a structural form of a patch type, an adhesive type, a magnetic adsorption type, a fixed installation type, or a suspension type.

The liquid metal-based information identification system of the present disclosure is described in combination with specific embodiments below.

Embodiment 1

This embodiment mainly applies a combination of a recognizer and a smart tag and aims at products having strict temperature requirements throughout a life cycle, such as cold chain drugs, food, etc., but it is not required to record temperature information in production and circulation stages of the product, but only a result of judgment needs to be reflected. The liquid metal-based information identification system, through utilizing the liquid metal-based smart tag, enables a product, of which a temperature exceeds a standard in the life cycle, to be intuitively identified.

A system is divided into two parts, i.e., the recognizer and the smart tag. The recognizer contains 3 probes that are respectively responsible for identifying product information (first information) carried by the smart tag, identifying a change in composition of the liquid metal in the information identification region, and identifying a change in magnetic property of the liquid metal in the information identification region. The smart tag includes six parts, including a chip, a flexible circuit, a sensor, a self-destruction system (i.e., a microfluidic channel having a vacuum chamber), an information identification region, and a warning unit.

Figure 2:
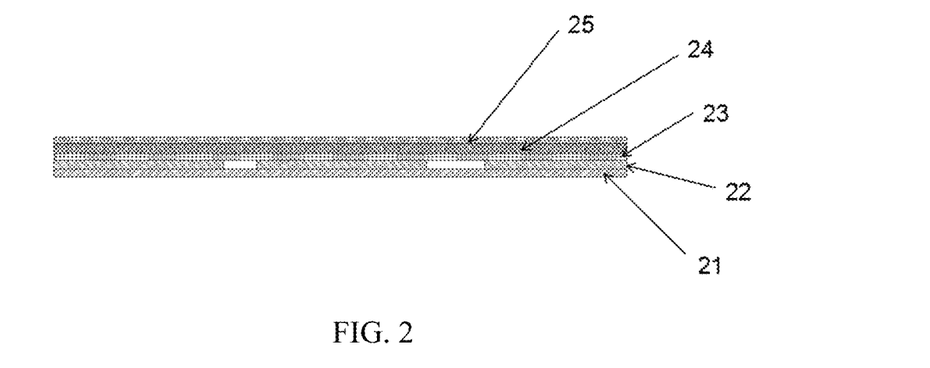
FIG. 2 is a schematic diagram of a smart tag according to an embodiment of the present disclosure.

FIG. 2 is a schematic diagram of the smart tag. 21 indicates a 3M adhesive layer which can be quickly pasted to a designated position of a product when a protective film is removed. 22 indicates a microfluidic channel layer through which the liquid metal in the phase transition enters a designated structure, so as to short-circuit or disconnect the flexible circuit. 23 indicates a liquid metal printing layer in which a graphic that is printed utilizing the liquid metal, the flexible circuit, the sensor, the chip, and the warning unit are located. 24 indicates an encapsulation layer, which encapsulates and fixes, mainly through a flexible material, the graphic, the circuit, the sensor, the chip, etc. that are in the liquid metal printing layer. 25 is a protecting layer, which protects a surface layer of the smart tag by spraying or coating, to achieve a specified waterproof and breathable performance. In actual application, by changing a microfluidic channel design of the microfluidic channel layer 22, different levels of confidentiality requirements are achieved, from losing functions of the smart tag to destructing data recorded in the smart tag.

Figure 3:
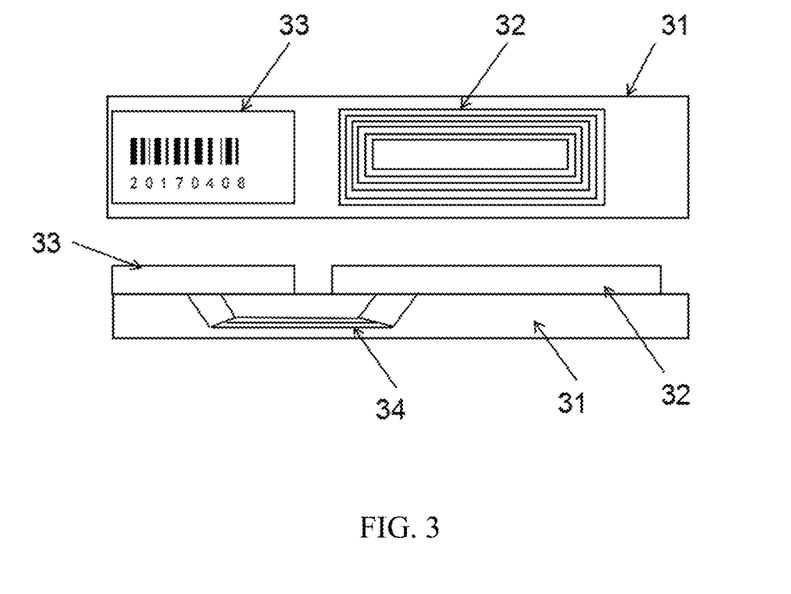
FIG. 3 is a schematic diagram of a microfluidic channel according to an embodiment of the present disclosure.

FIG. 3 is a schematic diagram of the microfluidic channel of the self-destruction system, 31 indicates a microfluidic channel layer, 32 indicates an antenna part of the flexible circuit, 33 indicates a liquid metal graphic located in the information identification region, and 34 indicates a microfluidic channel of the self-destruction system. Through designs of the microfluidic channel, a layout of the antenna in the flexible circuit 32 can be changed, so as to change an operating frequency and even lost functions. The liquid metal graphic 33 in the information identification region can be observed by users or consumers, and the rest structures of microfluidic channel are internal structures of the smart tag. In this embodiment, the liquid metal graphic located in the information identification region can be designed as a barcode (without doubt, it can also be designed as a two-dimensional code), so that in one aspect, it can be used as a production number of the product, and in another aspect, when the temperature exceeds the standard, the liquid metal is in an irreversible phase transition, and at this time, the liquid metal barcode will have an intuitive change which can be detected directly with a naked eye. Moreover, the production number of the product cannot be identified, so the product cannot continue to be circulated, and relevant information can only be checked through the recognizer.

A complete flow for the liquid metal-based information identification system to be applied to the products having strict temperature requirements throughout a life cycle, such as cold chain drugs, food, etc., is as follows. First, a liquid metal-based smart tag that has been prepared and activated is pasted or adhered to a designated region of the product in a designated process link of the product, and at this time, the smart tag begins to work. In each circulation link, when staffs scan the barcode of the smart tag, they can intuitively check whether the product has an abnormality in a previous circulation link, until the entire life cycle of the product ends. If an abnormal product is found, the staff can immediately discover it, feed back to the previous circulation link, and at the same time, consult detailed production information with the help of the recognizer.

Embodiment 2

This embodiment mainly applies a combination of the recognizer, the smart tag and the mobile energy supply module and still aims at products having strict temperature requirements throughout a life cycle, such as cold chain drugs, food, etc., and it is required to record temperature information throughout the life cycle.

On the basis of the Embodiment 1, the smart tag is equipped with a temperature sensor.

Figure 4:
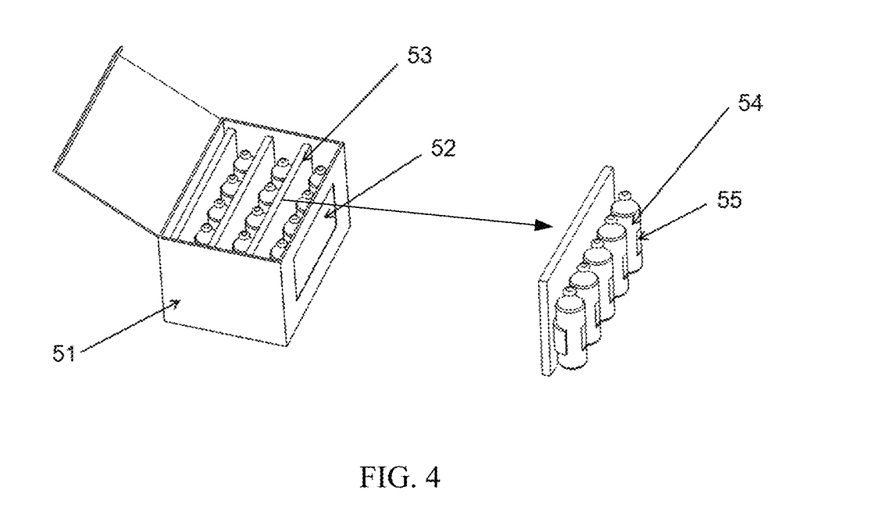
FIG. 4 is a schematic diagram of a layout of a smart tag and a mobile energy supply module in an application according to an embodiment of the present disclosure.

For the structure of the mobile energy supply module, its power source module is an ultra-thin thin film patch battery, and the second energy supply module supplies energy for the smart tag. While controlling the mobile energy supply module 41 to operate normally, the control module controls the second energy supply module to supply energy to the smart tag according to a preset mode.

FIG. 4 is a schematic diagram of a layout of the smart tag and the mobile energy supply module in the application. The mobile energy supply module provided in this embodiment is of a patch type. A product packaging box 51 is the smallest unit for the product to enter the circulation link. The mobile energy supply module 52 has a patch structure and is attached to a designated position of the product packaging box. The mobile energy supply module 52 is a double-sided 3M adhesive structure, and one side of the product packaging box 51 is configured to be attached to the product packaging box 51 and the other side of the product packaging box 51 is configured to affix a product tag (including product specifications, quantities, instructions, precautions, etc.). A joint product 53 is used for fixing one group of products, which is convenient for packaging. A product 54 is the smallest unit when recording data information. The smart tag 55 is adhered to a surface of the product.

The information identification system provided in the Embodiment 2 is mainly directed at information records including the temperature, dust particles, micro-organisms and so on in a period from the time at which the product leaves a factory to the time at which the life cycle of the product ends. The information identification system is characterized by that the mobile energy supply module can provide energy to the smart tag in the packaging box by means of induction, to ensure that the smart tag records data according to a preset time. In addition, the patch design of the double-sided 3M adhesive can better hide the mobile energy supply module, and occupy less space.

Embodiment 3

This embodiment mainly provides several groups of applications of physical anti-counterfeiting of the smart tag and reflects an anti-tear property of the smart tag.

In a first aspect, the liquid metal is combined with a flexible substrate having certain tensile properties to prepare the smart tag with an anti-tear function, which utilizes a characteristic that a liquid state appears when an ambient temperature reaches a phase transition temperature of the liquid metal.

First, a liquid metal of which a phase transition temperature is smaller than a use ambient temperature is selected to print and manufacture a functional circuit on a stretched flexible material, then relevant devices are installed, and finally packaging is carried out. The completely prepared smart tag is attached to the surface of the product by coating a glue, and stickiness of the glue keeps the smart tag to be in a stretched state. When the product is placed in a normal use circulation link, the liquid metal will be in a liquid state due to the ambient temperature being higher than its phase transition temperature. If the smart tag is forcibly removed from the surface of the product, since the flexible material recovers the state before being stretched, the smart tag that has lost a glue support force will lead the liquid metal of the functional circuit to shrink into a ball and thus it cannot be used, thereby guaranteeing that the smart tag is in a one-to-one correspondence to the product and cannot be copied.

Figure 5:
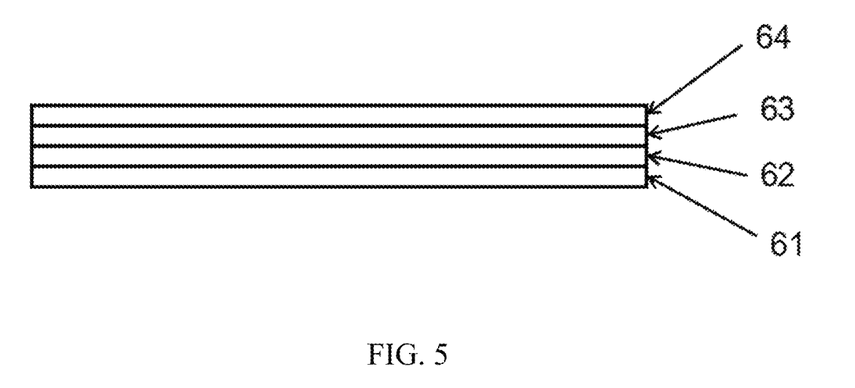
FIG. 5 is a schematic diagram of a smart tag according to another embodiment of the present disclosure.

In a second aspect, the liquid metal is combined with a fragile material to manufacture an anti-tear smart tag of which a schematic diagram is shown in FIG. 5. In FIG. 5, 61 indicates a 3M gum layer for being attached to the surface of the product, 62 indicates a fragile material layer for providing a the liquid metal printing substrate having a certain fragile structure, 63 indicates a liquid metal printing layer for manufacture the liquid metal circuit, and 64 indicates an encapsulation layer for fixing and integral encapsulation of elements of the smart tag. The fragile material described in the example can be a fragile sticker, a fragile thin film, etc., and its working principle is to take advantage of low yield strength of the fragile material, and even a very small external force can cause it to break, so it is impossible to provide a stable adhesion force for the liquid metal circuit, which leads to disconnection of the liquid metal circuit so that the smart tag loses its function, thereby achieving the purpose of anti-tear.

Embodiment 4

This embodiment mainly provides several applications of the self-destruction structure of the smart tag at the physical level. Two or more liquid metal materials with different phase transition temperature ranges are adopted to print the liquid metal functional circuit, such that when the smart tag is in the normal use environment, a part of the circuit thereof is in the liquid state, which is combined with a mechanical self-destruction switch. When it is required to start the self-destruction artificially during use, only the self-destruction switch needs to be manually switched on to change distribution of the liquid metal, which is in the liquid state, in the circuit, thereby starting the self-destruction system.

Figure 6:
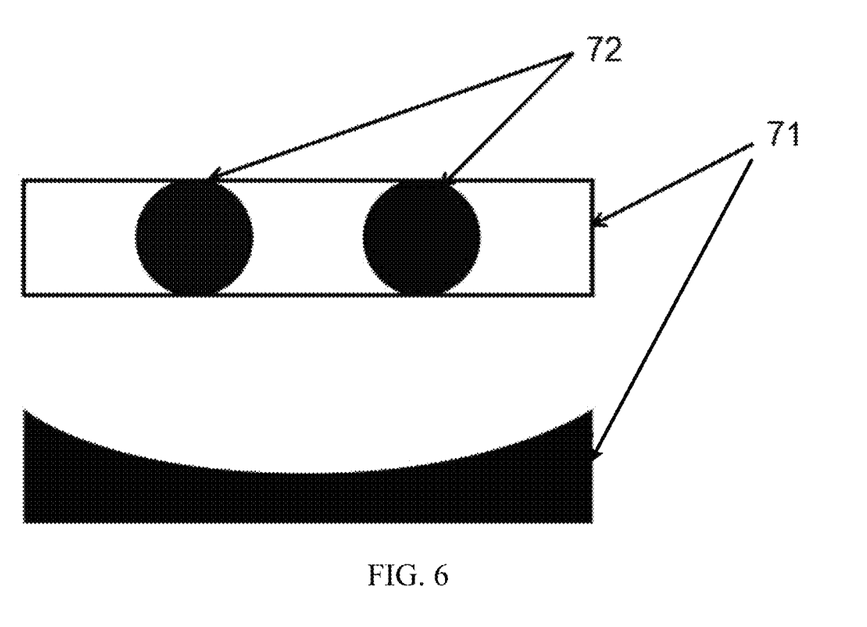
FIG. 6 is a schematic diagram of a self-destruction switch used in a smart tag according to yet another embodiment of the present disclosure.

FIG. 6 shows the self-destruction switch. That is, the liquid metal circuit that is partially in the liquid state in the smart tag is two liquid metal droplets 72 in a hollow chamber 71, and two ends of the chamber each are connected to the liquid metal functional circuit, but two droplets of the liquid metal cannot be conducted in a natural state. Referring to FIG. 6, when being artificially pressed externally, the chamber is deformed such that a volume of the chamber is reduced, and two droplets of the metal liquid can fill the chamber so as to conduct the circuit, thereby achieving the purpose of starting self-destruction.

Embodiment 5

This embodiment provides a flexible smart tag used for information storage and anti-counterfeiting identification of cultural relics such as porcelain and bronze ware.

Figure 7:
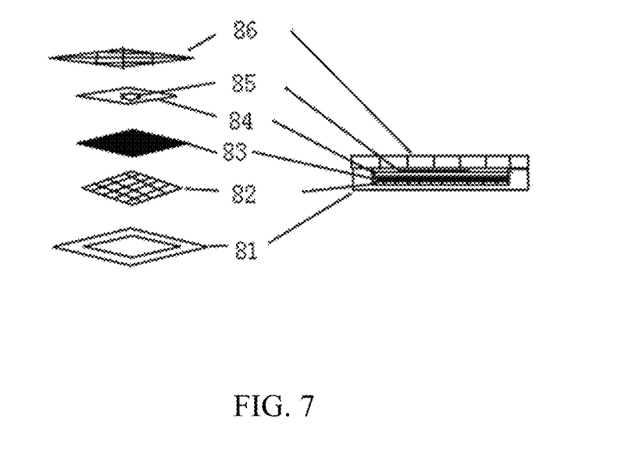
FIG. 7 is a schematic diagram of a smart tag according to yet another embodiment of the present disclosure.

The smart tag shown in FIG. 7 has a six-layer structure, which includes, from bottom to top, a release paper layer 81, an impermeable layer 82, an adhesive layer 83, a flexible substrate layer 84, a liquid metal printing layer 85, and a parting flexible encapsulation material layer 86. The flexible smart tag in this embodiment has a relatively simple structure, in which achieving of an anti-transfer function mainly depends on the upper two layers, i.e., the liquid metal printing layer and the parting flexible encapsulation material layer. The parting flexible encapsulation layer has a larger area than each of areas of the other four layers located at lower part of the tag, and when the smart tag is adhered to the cultural relics, only this parting flexible encapsulation layer can be directly contacted from outside, while the adhesive layer that is directly adhered to the cultural relics cannot be touched from outside. An encapsulation material is composed of two or more parts, and it is difficult to simultaneously and synchronously tear of all parts artificially. The liquid metal printing layer includes an antenna and circuit pattern composed of an alloy having a melting point of 60° C. as a base and an alloy having a melting point of 20° C. as a supplement, respectively. When removing the encapsulation through peeling the encapsulation, a portion of a torn encapsulation material will adhere a liquid metal having a melting point of 20° C. at the lower layer, and after the liquid metal turns into a ball-shape, it cannot recover back to its original state before tearing. Moreover, the parting encapsulation material used becomes brittle when the temperature is lowered to −30° C., and the liquid metal is easily broken under external forces and cannot be repaired.

Figure 8:
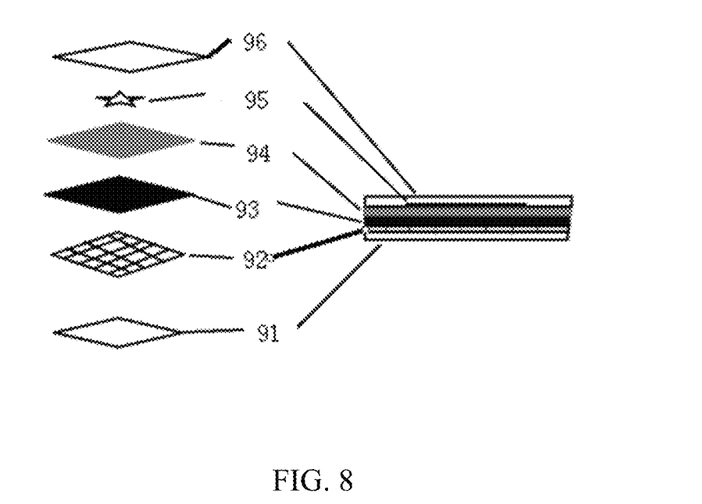
FIG. 8 is a schematic diagram of a smart tag according to yet another embodiment of the present disclosure.

The smart tag shown in FIG. 8 has a six-layer structure, which includes, from bottom to top, a release paper layer 91, an impermeable layer 92, an adhesive layer (or a non-mark adhesive layer) 93, a vulnerable material layer 94, a liquid metal printing layer 95 and a thin-layer encapsulation material layer 96. In this embodiment, tensile strength of the vulnerable material is far lower than peel strength of the adhesive, and thus it cannot be transferred without damage after being pasted.

Although the embodiments of the present disclosure have been described with reference to the accompanying drawings, those skilled in the art can make various modifications and variations without departing from the spirit and scope of the present disclosure, and all such modifications and variations fall into the scope defined by the appended claims.

What is claimed is:

1. A liquid metal-based information identification system, comprising:
   a recognizer; and
   a smart tag configured to record environment information from at least one sensor of an environment in which an article is located, and to transmit the environment information to the recognizer through a flexible circuit, wherein
   the smart tag is provided in the flexible circuit;
   the flexible circuit comprises a circuit made of a liquid metal;
   a microfluidic channel having a vacuum chamber is provided in the circuit made of the liquid metal;
   when the liquid metal is in a phase transition, the liquid metal enters the microfluidic channel in such a manner that the circuit made of the liquid metal is short-circuited or disconnected to make the smart tag incapable of transmitting data; and
   the recognizer is configured to receive and analyze the environment information and to download first information on a production link of the article to the smart tag;
   the flexible circuit comprises a flexible substrate and a liquid metal circuit;
   the liquid metal circuit is attached to the flexible substrate and comprises the circuit made of the liquid metal and an antenna made of the liquid metal;
   the at least one sensor comprises one or more of a temperature sensor, a humidity sensor, an air pressure sensor, a vibration sensor, a pressure sensor, a speed sensor, an acceleration sensor, a gravity sensor, a light sensor, an electromagnetic radiation sensor, an ionizing radiation sensor, a noise sensor, a gas sensor, a dust particle sensor, or a micro-organism detection sensor; and
   the smart tag comprises:
   a chip configured to control the at least one sensor to work, to transmit the environment information collected by the at least one sensor to the recognizer through the flexible circuit, and to store the first information; and
   a warning unit configured to warn when at least one datum collected by the at least one sensor exceeds a corresponding threshold.

2. The system according to claim 1, wherein
   the recognizer comprises a data transmission module, a first energy supply module, an analysis module and an information storage module;

the data transmission module is configured to establish connection with the smart tag to perform bidirectional transmissions of data;

the first energy supply module is configured to supply energy to the smart tag to enable the smart tag to upload and download data;

the analysis module is configured to analyze the environment information transmitted by the smart tag, a graphic change, a change in a magnetic property of the liquid metal and a change in composition of the liquid metal that are caused by the phase transition of the liquid metal in an information identification region of the smart tag, and to store an analysis result in the information storage module;

the smart tag has the information identification region, in which a graphic drawn by the liquid metal is arranged;

the graphic is a pattern that is obtained by sequentially coding and symbolizing second information in an article circulation link, or an identifiable pattern that is randomly generated; and the information storage module is further configured to store the first information.

3. The system according to claim 1, wherein the chip comprises a control chip and a memory chip;

the circuit made of the liquid metal comprises a fuse circuit;

the memory chip stores the first information; and when the at least one datum collected by the least one sensor exceeds the corresponding threshold, the control chip starts the fuse circuit to operate in such a manner that the circuit made of the liquid metal is fused or the memory chip is burned.

4. The system according to claim 1, further comprising:

a mobile energy supply module configured to supply energy to the smart tag.

5. The system according to claim 4, wherein the mobile energy supply module comprises:

a power source module configured to provide an energy supply source;

a second energy supply module configured to supply energy to the smart tag by using the energy supply source; and a control module, configured to control an energy supply to the second energy supply module.

6. The system according to claim 5, wherein the control module is configured to control a manner in which the second energy supply module supplies energy to the smart tag, and the manner comprises continuous energy supply, intermittent energy supply, energy supply in a preset time period, or condition-triggered energy supply.

7. The system according to claim 4, wherein the mobile energy supply module has a structural form of a patch type, an adhesive type, a magnetic adsorption type, a fixed installation type, or a suspension type.

* * * * *